No. 764,054.    Patented July 5, 1904.

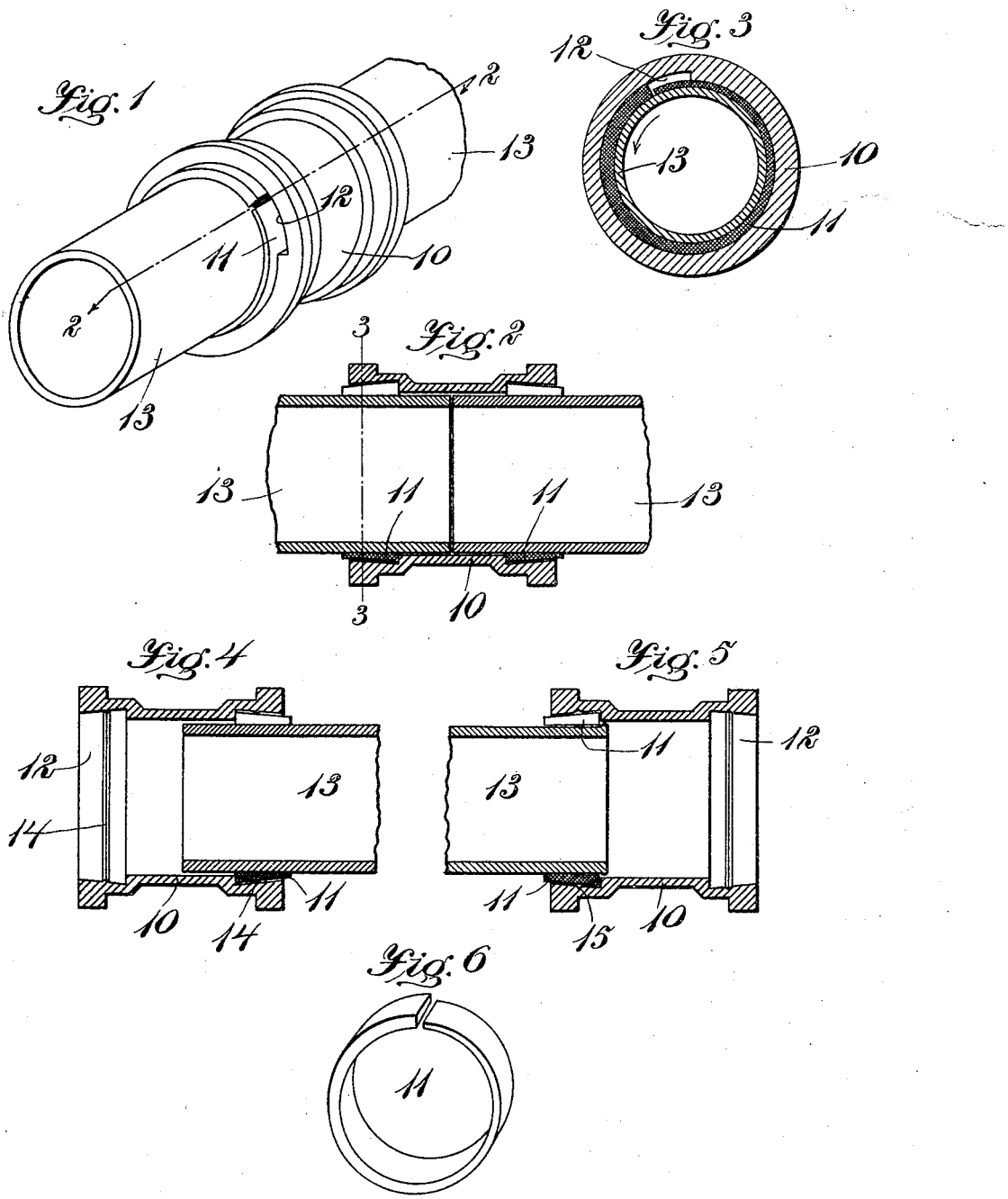

UNITED STATES PATENT OFFICE.

FREDERICK A. HOUDLETTE, OF MELROSE, MASSACHUSETTS.

COUPLING FOR CONDUITS.

SPECIFICATION forming part of Letters Patent No. 764,054, dated July 5, 1904.

Application filed March 11, 1904. Serial No. 197,627. (No model.)

*To all whom it may concern:*

Be it known that I, FREDERICK A. HOUDLETTE, of Melrose, in the county of Middlesex and State of Massachusetts, have invented certain new and useful Improvements in Couplings for Conduits, of which the following is a specification.

This invention relates to coupling devices for plain cylindrical members, and relates particularly to couplings for hollow cylindrical members, such as electrical conduits or pipes for any kind of fluid or oil-well casings or for connecting faucets to pipes.

The object of the invention is to provide means whereby screw-threads or flanges on any of the parts may be dispensed with, the members of the coupling being securely clamped together by a wedging action.

To these ends the invention consists in the construction substantially as hereinafter described and claimed.

Of the accompanying drawings, forming a part of this specification, Figure 1 is a perspective view representing two pipes connected by a coupling embodying my invention. Fig. 2 represents a section on the line 2 2 of Fig. 1. Fig. 3 represents a section on the line 3 3 of Fig. 2. Fig. 4 is a view similar to one end of Fig. 2, but illustrating a modification hereinafter described. Fig. 5 is a view similar to Fig. 4, but illustrating another modification. Fig. 6 is a perspective view of the wedging member of the coupling.

Similar reference characters indicate the same or similar parts throughout the several views.

The sleeve or outer member of the coupling is represented at 10, said member having at each end a groove or annular chamber 12 to receive the circular wedge or inner split member 11 of the coupling. The groove or chamber 12 is slightly deeper at its inner portion than at the end of the outer member 10. The inclination or taper of the wall of said chamber is preferably somewhat less than as shown in the drawings, in which the taper is exaggerated to render the operation hereinafter described clearer.

The cylinder or pipe which is to be secured to the sleeve or outer member 10 is represented at 13. The outer diameter of the cylinder or pipe 13 is of course somewhat less than the inner diameter of the central portion of the sleeve 10 and considerably less than the diameter across the end of the sleeve in which the chamber 12 is formed. In the space between the outer surface of the cylinder or pipe 13 and the bottom of the groove 12 is fitted the circular wedge 11, which is preferably of relatively soft metal, such as lead. This inner member 11 of the coupling is not only tapered from end to end, as clearly shown in Fig. 6, but is also preferably tapered in cross-section, so as to quite closely fit the chamber 12. As shown in Fig. 6, there is of course a slight opening between the thick end of the circular wedge and the thin end. Practically this member may be termed a "split ring," having one end thicker than the other, the ends being adapted to meet or to separate when the parts are being manipulated.

As shown in Fig. 3, the chamber 12 substantially corresponds with the circular shape of the member 11—that is, while the inner surface of the member 11 forms a true circle the outer surface is a spiral and the inner surface or bottom of the groove 12 is also a spiral.

It will now be understood that when the two members of the coupling are assembled as shown, with one end of a pipe or cylinder 13 extending inside of the coupling, then if the said cylinder or pipe 13 and the circular wedge be rotated in the direction of the arrow in Fig. 3 relatively to the outer member of the coupling the said wedge or inner member of the coupling will be firmly clamped upon the cylinder or pipe 13 and hold the latter with absolute security relatively to the sleeve or outer member 10 of the coupling. Of course, as shown in Fig. 3, a slight space is left between the two ends of the circular wedge and a short space is also left outside of the thin end of the circular wedge. In practice if the coupling is to be used for connecting the sections or conduits which are to convey a fluid the space mentioned will be filled by a suitable wedge or key or any appropriate packing, such as lead.

In order to insure a tight joint, the bottom of the chamber 12 may be formed with a circular rib 14, as indicated in Fig. 4, which rib will bite or cut into the outer surface of the circular wedge, or the bottom of said chamber 12 may be formed with a groove 15, as shown in Fig. 5, into which groove portions of the circular wedge will be pressed or forced, so as to make a tight joint.

The main or central portion of the sleeve or outer member 10 is internally cylindrical and receives and steadies the end of the pipe or cylinder 13. The same member which is provided with the internally-cylindrical portion has also (at each end as shown in the present drawings) a portion the inner surface of which is cam-shaped. This cam-shaped portion is the bottom of the recess or annular chamber 12. The outer surface of the inner divided member 11 of the coupling is correspondingly cam-shaped, said inner member being preferably in practice of a relatively soft metal, such as lead. Therefore any lateral strain which might bend or twist the parts 10 and 13 out of axial alinement if resistance thereto were afforded solely by the member 11 will be resisted by the cylindrical portion of the member 10, into which the cylinder 13 extends. In the drawings for the sake of clearness a somewhat exaggerated space is shown between the outer surface of the end of the pipe or cylinder 13 and the inner surrounding surface of the member 10; but in practice the fit is as close as may be had without binding.

Having thus explained the nature of my invention and described a way of constructing and using the same, although without having attempted to set forth all the forms in which it may be embodied or all the modes of its use, I declare that what I claim is—

1. A coupling device comprising inner and outer members, the outer member having a portion the inner surface of which is cylindrical and a portion the inner surface of which is cam-shaped, and the inner member being divided and having a cam-shaped outer surface, whereby rotative movement of one member relatively to the other will cause a wedging action of the inner member on a cylinder fitted within said device while a portion of said cylinder extends into and is steadied by the cylindrical portion of the outer member.

2. A coupling device comprising an outer member having an internally-cylindrical portion and having a chamber or groove formed in its end, the bottom of said groove being spiral, and an inner member comprising a circular wedge open or divided between the thick and thin portions and adapted to coöperate with the spiral bottom of said groove of the outer member to cause the wedge to clamp a cylinder embraced by said wedge while a portion of said cylinder extends into and is steadied by the cylindrical portion of the outer member.

3. A coupling device comprising an outer member having an internally-cylindrical portion and having a chamber or groove formed in its end, the bottom of said groove being spiral, and an inner member comprising a circular wedge open or divided between the thick and thin portions and adapted to coöperate with the spiral bottom of said groove of the outer member to cause the wedge to clamp a cylinder embraced by said wedge while a portion of said cylinder extends into and is steadied by the cylindrical portion of the outer member, said wedge being of soft metal.

4. A coupling device comprising an outer member having an internally-cylindrical portion and having a chamber or groove formed in its end, the bottom of said groove being spiral, and an inner member comprising a circular wedge open or divided between the thick and thin portions and adapted to coöperate with the spiral bottom of said groove of the outer member to cause the wedge to clamp a cylinder embraced by said wedge while a portion of said cylinder extends into and is steadied by the cylindrical portion of the outer member, said wedge being of soft metal, and the bottom of said groove or chamber of the outer member being formed to interlock with the outer surface of the wedge.

In testimony whereof I have affixed my signature in presence of two witnesses.

FREDERICK A. HOUDLETTE.

Witnesses:
A. W. HARRISON,
R. M. PIERSON.